(12) United States Patent
Chou et al.

(10) Patent No.: US 8,405,935 B2
(45) Date of Patent: Mar. 26, 2013

(54) MAGNETO-RESISTIVE EFFECT ELEMENT HAVING SPACER LAYER INCLUDING MAIN SPACER LAYER CONTAINING GALLIUM OXIDE AND NONMAGNETIC LAYER

(75) Inventors: Tsutomu Chou, Tokyo (JP); Yoshihiro Tsuchiya, Tokyo (JP); Hironobu Matsuzawa, Tokyo (JP); Hayato Koike, Tokyo (JP)

(73) Assignee: TDK Corporation, Tokyo (JP)

( * ) Notice: Subject to any disclaimer, the term of this patent is extended or adjusted under 35 U.S.C. 154(b) by 267 days.

(21) Appl. No.: 12/979,613

(22) Filed: Dec. 28, 2010

(65) Prior Publication Data
US 2012/0164484 A1   Jun. 28, 2012

(51) Int. Cl.
   G11B 5/39   (2006.01)
(52) U.S. Cl. .................................... 360/324.1
(58) Field of Classification Search ............... 360/324.1
   See application file for complete search history.

(56) References Cited

U.S. PATENT DOCUMENTS

| | | | |
|---|---|---|---|
| 7,764,470 B2 * | 7/2010 | Mizuno et al. ............ | 360/324.1 |
| 7,834,410 B2 * | 11/2010 | Wang et al. ................ | 257/421 |
| 7,895,731 B2 * | 3/2011 | Mizuno et al. ............ | 29/603.13 |
| 8,015,694 B2 * | 9/2011 | Carey et al. ............... | 29/603.16 |
| 2005/0141144 A1 * | 6/2005 | Koui et al. ................. | 360/324 |
| 2008/0062557 A1 | 3/2008 | Tsuchiya et al. | |
| 2008/0100968 A1 | 5/2008 | Shimazawa et al. | |
| 2008/0106827 A1 | 5/2008 | Shimazawa et al. | |
| 2009/0002893 A1 | 1/2009 | Tsuchiya et al. | |
| 2009/0034134 A1 * | 2/2009 | Yuasa et al. .............. | 360/324.11 |
| 2010/0106827 A1 | 4/2010 | Park et al. | |
| 2010/0214696 A1 | 8/2010 | Matsuzawa et al. | |
| 2010/0232066 A1 | 9/2010 | Hara et al. | |

FOREIGN PATENT DOCUMENTS

| | | |
|---|---|---|
| JP | A-2005-116791 | 4/2005 |
| JP | 2008-091842 A | 4/2008 |
| JP | A-2008-112880 | 5/2008 |
| JP | A-2010-199539 | 9/2010 |

OTHER PUBLICATIONS

Office Action mailed Dec. 11, 2012 in corresponding JP Application No. 2011-222762 (English translation only).

* cited by examiner

*Primary Examiner* — Mark Blouin
(74) *Attorney, Agent, or Firm* — Posz Law Group, PLC

(57) ABSTRACT

A magnetoresistive effect element (MR element) includes first and second magnetic layers of which relative angles formed by magnetization directions change in relation to an external magnetic field; and a spacer layer positioned between the first magnetic layer and the second magnetic layer. The first magnetic layer is positioned on a side closer than the second magnetic layer in regards to a substrate above which the magnetoresistive effect element is formed, and the spacer layer includes a main spacer layer made of gallium oxide as the primary component, and a first nonmagnetic layer positioned between the main spacer layer and the first magnetic layer and contains copper and gallium.

10 Claims, 7 Drawing Sheets

⊗ Magnetization Direction: from front side to back side of the sheet
⊙ Magnetization Direction: from back side to front side of the sheet

MAGNETO-RESISTIVE EFFECT ELEMENT HAVING SPACER LAYER INCLUDING MAIN SPACER LAYER CONTAINING GALLIUM OXIDE AND NONMAGNETIC LAYER

BACKGROUND OF THE INVENTION

1. Field of the Invention

The present invention relates to a magnetoresistive effect element (MR element) and particularly relates to a configuration of a spacer layer.

2. Description of the Related Art

Reproducing heads having high sensitivity and high output are in demand in conjunction with condensing of high recording density in hard disk drives (HDD). A spin valve head has been developed as an example of this type of reproducing head. A spin valve head includes a nonmagnetic metal layer and a pair of ferromagnetic layers positioned to contact both sides of the nonmagnetic metal layer. The magnetization direction of one side of the ferromagnetic layers is pinned in one direction (hereinafter, this type of layer is referred to as a magnetization pinned layer), and the magnetization direction of the other side of the ferromagnetic layers freely rotates in response to an external magnetic field (hereinafter, this type of layer is referred to as a magnetization free layer). When an external magnetic field is applied, the relative angle of the spins between the magnetization pinned layer and the magnetization free layer change so that a magnetoresistive change is realized. Typically, the magnetization direction of the magnetization pinned layer is pinned by utilizing the exchange coupling force of an anti-ferromagnetic layer.

Realizing further condensing of high recording density requires a read gap (a space between upper and lower shield layers) to be reduced. However, when reducing the read gap to about 20 nm, placing an anti-ferromagnetic layer within the read gap becomes difficult. Therefore, a configuration has been developed in which a pair of magnetization free layers is arranged on both sides of a spacer layer. According to this configuration, reduction of the read gap is easily realized because an anti-ferromagnetic layer is unnecessary.

With either configuration, the spacer layer is a necessary component to realize a magnetoresistive change, and promising spacer layer materials have been developed to achieve large magnetoresistive ratio (hereinafter referred to as MR ratio). Oxide semiconductors such as ZnO and TiO are known examples.

For example, U.S. Patent Publication No. 2008/0062557 discloses the technology in which a nonmagnetic metal layer is disposed between an oxide semiconductor layer such as ZnO or TiO, etc., and a ferromagnetic layer composed of CoFe or the like. Copper, gold, silver, and the like are given as examples of nonmagnetic metal layers.

The ferromagnetic layer adjacent to the spacer layer is generally composed of Co, Ni, Fe, or the like as a primary component, and when these elements are arranged to contact the oxide semiconductor layer, such an arrangement leads problems that the ferromagnetic layer is oxidized by the oxidative effect of oxygen contained in the oxide semiconductor layer, that the oxidation reduces the polarizability and thereby reduces the MR ratio. In the technology described in US2008/0062557, the nonmagnetic metal layer such as copper, gold, silver, or the like can be expected to prevent oxidation of the ferromagnetic layer. However, because a simple metal such as copper, gold, silver, or the like is more likely to become island-shaped when the film thickness is thin, a certain film thickness is required in order to function as an oxidation preventing film. On the other hand, when the film thickness is too thick, electrons are easily scattered which reduces the MR ratio.

An object of the present invention is to provide a magnetoresistive effect element that can prevent oxidation of a magnetic layer adjacent to a spacer layer and realize a large MR ratio.

SUMMARY OF THE INVENTION

An MR element of the present invention includes first and second magnetic layers of which relative angles formed by magnetization directions change in relation to an external magnetic field; and a spacer layer positioned between the first magnetic layer and the second magnetic layer. The first magnetic layer is positioned on a side closer than the second magnetic layer in regards to a substrate above which the magnetoresistive effect element is formed, and the spacer layer includes a main spacer layer made of gallium oxide as the primary component, and a first nonmagnetic layer positioned between the main spacer layer and the first magnetic layer and contains copper and gallium.

A spacer layer that provides a main spacer layer with gallium oxide as the primary component has higher resistance than the conventional spacer layer formed with a metal layer such as copper or the like, and therefore a larger MR ratio can be realized. Gallium oxide normally resides in an amorphous state in a thin film condition and has benefits in that even in an amorphous state it can have a large band gap while not requiring lattice matching (matching lattice constant of two adjacent materials) with the ferromagnetic layer adjacent to the spacer layer. The ferromagnetic layer adjacent to the spacer layer is generally composed of Co, Ni, Fe, or the like as a primary component as described above; and, there is a problem in that when these elements are arranged to contact gallium oxide, the ferromagnetic layer is oxidized by the oxidative effect of oxygen contained in the gallium oxide which reduces the MR ratio. Specifically, gallium oxide has potentials that oxygen of gallium oxide oxidizes the element that configures the first magnetic layer, that the oxidation reduces the polarizability, and thereby reduces the MR ratio. The oxidation of Fe particularly has the potential to lead to a reduction in a significant MR ratio. In addition, the MR element may go through a heating process after a laminated film is formed, and in that case, there is potential for a more prominent decrease in the MR ratio due to oxidation of the magnetic layer. However, the first nonmagnetic layer that includes copper and gallium and is positioned between the main spacer layer and the first magnetic layer prevents movement of oxygen to the first magnetic layer and prevents oxidation of the elements that configure the first nonmagnetic layer. Moreover, in comparison to a simple metal, the first nonmagnetic layer is less likely to be formed in island-shape even when its film thickness is reduced and there is a smaller effect on the MR ratio. Therefore, according to the reasons given above, oxidation of the first magnetic layer can be prevented, and reduction in the MR ratio can be suppressed.

The above description, as well as other objects, features, and advantages of the present specification will be evident by the detailed description that follows below with reference to attached drawings illustrating the present specification.

DETAILED DESCRIPTION OF THE INVENTION

A description is given, with reference to drawings, of several embodiments of an MR element that relates to the embodiments of the present invention and a thin film magnetic head that uses the MR element.

First Embodiment

Figure 1:
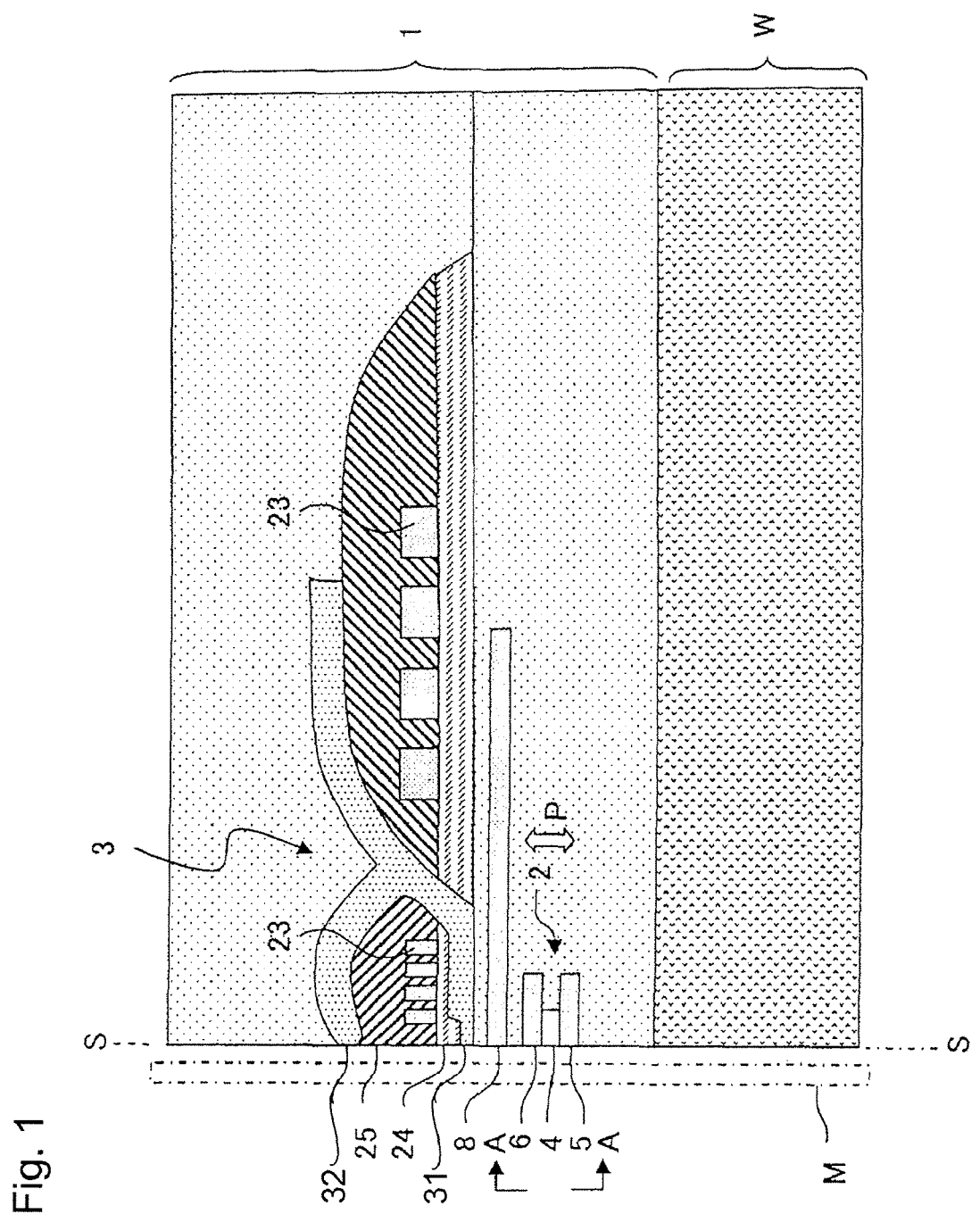
FIG. 1 is a main part cross-sectional view of a thin film magnetic head that relates to a first embodiment.
Figure 2:
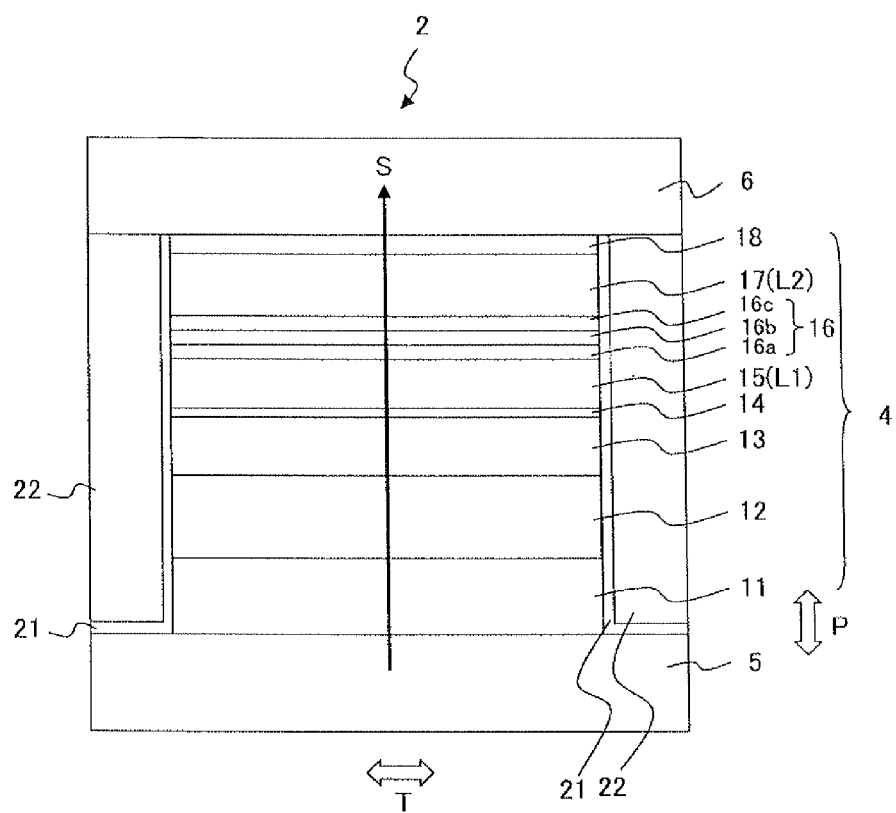
FIG. 2 is a side view of an MR element as viewed from the A-A direction, i.e. an air bearing surface, of FIG. 1.

FIG. 1 illustrates a main part cross-sectional view of a thin film magnetic head 1 that relates to a first embodiment. The thin film magnetic head 1 is formed on a substrate W and includes a reproducing head 2 and a recording head 3. FIG. 2 is a side view of the reproducing head 2 as viewed from the A-A direction of FIG. 1 and illustrates the layer configuration of the reproducing head 2 on the air bearing surface S. The air bearing surface S is a surface of the thin film magnetic head 1 that opposes the recording medium M. An initial description will be given of the configuration of the reproducing head 2 with reference to FIG. 2.

The reproducing head 2 includes a spin valve type MR element 4, upper and lower shield layers 6 and 5 disposed so as to sandwich the MR element 4 in a film surface orthogonal direction (lamination direction) P, and bias magnetic field application layers 22 disposed on both sides of the MR element 4 in the track width direction T (paper surface orthogonal direction in FIG. 1). The tip end part of the MR element 4, as illustrated in FIG. 1, is arranged on the air bearing surface S. The MR element 4 is configured so that a sense current S flows in a film surface orthogonal direction P by a voltage applied between the upper shield layer 6 and the lower shield layer 5. A magnetic field from the recording medium M in a position that opposes the MR element 4 changes corresponding to the rotation of the recording medium M. The change in the magnetic field is detected as an electrical resistance change in the sense current S based on the MR effect. The MR element 4 utilizes this principle to read the magnetic information written to the recording medium M.

Table 1 illustrates an example of the layer configuration of the MR element 4. Table 1 lists the lamination order from the bottom to the top from the lower shield layer 5 to the upper shield layer 6.

TABLE 1

| Layer Configuration | | | Material | Film Thickness (nm) |
|---|---|---|---|---|
| Upper Shield Layer 6 | | | NiFe | 2000 |
| MR Element 4 | Protective Layer 18 | | Ru | 2.0 |
| | Magnetization Free Layer 17 (Second Magnetic Layer L2) | | CoFe | 4.0 |
| | Spacer Layer 16 | Second Nonmagnetic Layer 16c | CuGa, Cu or Zn | 0.4 |
| | | Main Spacer Layer 16b | GaOx | 0.8 |
| | | First Nonmagnetic Layer 16a | CuGa | 0.4~1.0 |
| | Inner Magnetization Pinned Layer 15 (first magnetic layer L1) | | CoFe | 3.5 |
| | Exchange Coupling Transmitting Layer 14 | | Ru | 0.8 |
| | Outer Magnetization Pinned Layer 13 | | CoFe | 3.0 |
| | Anti-Ferromagnetic Layer 12 | | IrMn | 5.0 |
| | Under Layer 11 | | NiCr | 4.0 |
| Lower Shield Layer 5 | | | NiFe | 2000 |

The MR element 4 has a layer configuration in which the following are laminated on the lower shield layer 5 composed of an NiFe layer in this order: an under layer 11, an anti-ferromagnetic layer 12, an outer magnetization pinned layer 13, an exchange coupling transmitting layer 14, an inner magnetization pinned layer 15 (first magnetic layer L1), a spacer layer 16, a magnetization free layer 17 (second magnetic layer L2), and a protective layer 18. The protective layer 18 is covered by the upper shield layer 6 composed of a NiFe layer.

The under layer 11 is disposed in order to obtain a favorable exchange coupling between the outer magnetization pinned layer 13 and the anti-ferromagnetic layer 12 laminated on the under layer 11. The outer magnetization pinned layer 13 is exchange coupled to the anti-ferromagnetic layer 12 composed of IrMn. The outer magnetization pinned layer 13 is exchange coupled with the inner magnetization pinned layer 15 with the exchange coupling transmitting layer 14 composed of Ru therebetween. As a result, the magnetization direction of the inner magnetization pinned layer 15 is firmly pinned. The inner magnetization pinned layer 15 is preferably magnetized in a direction that is orthogonal to the air bearing surface S within the film plane. The magnetization directions of the inner magnetization pinned layer 15 and the outer magnetization pinned layer 13 are pinned in mutually anti-parallel orientations, and thus the overall magnetization of these combined areas can be suppressed. The magnetization free layer 17 of which the magnetization direction changes corresponding to an external magnetic field is disposed on the inner magnetization pinned layer 15 sandwiching the spacer layer 16. The protective layer 18 is disposed to prevent the deterioration of each laminated layer. The outer and inner magnetization pinned layers 13 and 15, together with the magnetization free layer 17, are typically composed of CoFe and may contain Ni.

The bias magnetic field application layers 22 are formed on both sides of the MR element 4 in the track width direction T with an insulating film 21 therebetween. The bias magnetic field application layers 22 are a magnetic domain controlling film in order to make the magnetization free layer 17 a single magnetic domain, and applies a bias magnetic field to the magnetization free layer 17 in the track width direction T. The insulating film 21 is formed of $Al_2O_3$, and the bias magnetic field application layers 22 are formed of CoPt, CoCrPt, or the like.

The sense current S flows in a film surface orthogonal direction P to the MR element 4. The sense current S is supplied from the upper and lower shield layers 6 and 5 which also function as electrodes. The magnetization direction of the magnetization free layer 17 is controlled in the track width direction T, i.e. in the direction orthogonal to the magnetization direction of the inner magnetization pinned layer 15, by the bias magnetic field from the bias magnetic field application layers 22 when an external magnetic field is not applied. When the external magnetic field from the recording medium M is applied to the magnetization free layer 17, the magnetization direction of the magnetization free layer 17 rotates by a prescribed angle in the predefined direction within the film plane corresponding to the direction and strength of the external magnetic field. The magnetization direction of the magnetization free layer 17 forms a relative angle corresponding to the direction and strength of the external magnetic field in relation to the magnetization direction of the inner magnetization pinned layer 15, and the spin dependent scattering of the conductive electrons changes corresponding to the relative angle, thereby generating a magnitoresistive change. The MR element 4 detects this magnitoresistive change and reads the magnetic information of the recording medium M.

The magnetization free layer 17 and the outer and inner magnetization pinned layers 13 and 15 may be disposed in reverse upper and lower positions in relation to the spacer layer 16. That is to say, the magnetization free layer 17 may be positioned closer to the substrate W than the outer and inner magnetization pinned layers 13 and 15. Specifically, the layers from the inner magnetization pinned layer 15 to the anti-ferromagnetic layer 12 are arranged between the protective layer 18 and the spacer layer 16 (arranged so that the inner magnetization pinned layer 15 is at the bottommost side and the anti-ferromagnetic layer 12 is at the top-most side), and the magnetization free layer 17 is arranged between the under layer 11 and the spacer layer 16.

In the present specification, in terms of the magnetization free layer 17 and the inner magnetization pinned layer 15, the layer positioned closer to the substrate W above which the MR element 4 is formed, i.e. beneath the spacer layer 16 as viewed in the lamination direction, is called the first magnetic layer L1, and the layer positioned farther from the first magnetic layer L1 as viewed from the substrate W, i.e. above the spacer layer 16 as viewed in the lamination direction, is called the second magnetic layer L2. In the layer configuration illustrated in Table 1, the inner magnetization pinned layer 15 is the first magnetic layer L1, and the magnetization free layer 17 is the second magnetic layer L2, and in the layer configuration with the opposite positional relation, the magnetization free layer 17 is the first magnetic layer L1, and the inner magnetization pinned layer 15 is the second magnetic layer L2.

The spacer layer 16 includes a main spacer layer 16b composed of gallium oxide as a primary component. The main spacer layer 16b may contain additives other than gallium oxide, for example metal oxides, and the mole fraction of gallium oxide within the main spacer layer 16b is preferably a minimum of 50%. The composition of gallium oxide is expressed by the general formula GaOx where the range of x is $1.45 \leq x \leq 1.55$. The main spacer layer 16b is normally formed in an amorphous state. GaOx has a larger resistance value and also a larger resistance change compared to Cu used in a conventional spacer layer. Therefore, a larger MR ratio may be obtained compared to the conventional MR element in which Cu is used as the spacer layer.

Gallium oxide is a promising material for realizing a high MR ratio. However, because it contains oxygen, when the first and second magnetic layers L1 and L2 are adjacent to the main spacer layer 16b, elements such as Fe, Co, Ni, and the like contained in the first and second magnetic layers L1 and L2, and particularly Fe, have a tendency for oxidation. When these elements oxidize, there is a tendency for the MR ratio to fall.

Therefore, for the purpose of avoiding direct contact between the main spacer layer 16b and the first magnetic layer L1, and to effectively prevent oxidation of the first magnetic layer L1, the spacer layer 16 includes a first nonmagnetic layer 16a (CuGa layer) that contains copper and gallium. The first nonmagnetic layer 16a is preferably made of essentially Cu and Ga and may contain a small amount of additive. The first nonmagnetic layer 16a may partially oxidize. In other words, the first nonmagnetic layer 16a may be made essentially of Cu, Ga, and O. The first nonmagnetic layer 16a is positioned between the main spacer layer 16b and the first magnetic layer L1 in contact with both.

Figure 3:
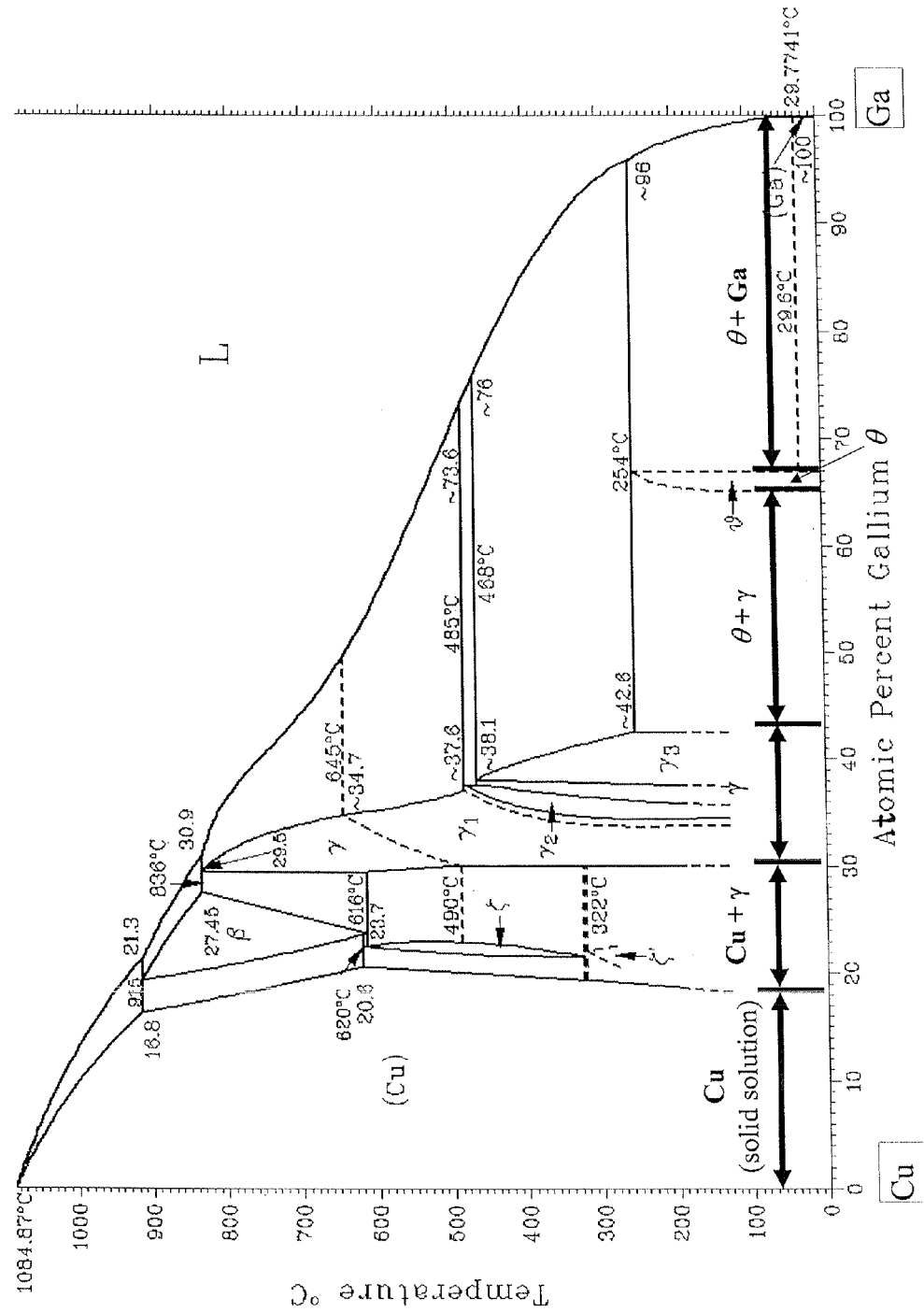
FIG. 3 is a phase diagram of a CuGa alloy.

FIG. 3 illustrates a phase diagram of Ga—Cu. When the ratio of Cu is large, Cu and Ga exist in a Cu phase solid solution state. The Cu phase solid solution has the crystal structure of Cu, and Cu atoms of the solid solution are partially substituted by Ga atoms. When increasing the ratio (atomic percent) of Ga, γ-phase and θ-phase, which are intermetallic compounds, appear. A region between the Cu phase solid solution and the γ-phase is a mixed phase of these (expressed as Cu+γ in the drawing), and a region between the γ-phase and θ-phase is a mixed phase of these (expressed as θ+γ in the drawing). When further increasing the ratio of Ga, a mixed phase of θ-phase and Ga phase appears.

The inventors of the present invention measured the MR ratio for a variety of compositions indicated in the phase diagram by changing variously ratios of Ga and Cu in the first nonmagnetic layer 16a as described hereinafter. As a result, the inventors discovered that a particularly large MR ratio could be obtained stably when the atomic percent of gallium to the total content of copper and gallium in the first nonmagnetic layer 16a is within the range of a minimum of 30% to a maximum of 65%. The range of this atomic percent nearly matches the range where the γ-phase and θ-phase, which are intermetallic compounds, as well as the mixed phase (θ+γ) are formed. It is assumed that the γ-phase and θ-phase as well as the mixed phase (θ+γ) are highly effective in preventing the penetration and diffusion of oxygen. In other words, it is assumed that preventing oxidation of the first magnetic layer L1 is easy because the CuGa alloy exists, or easily exists, as an intermetallic compound when the atomic percent of gallium to the total content of copper and gallium is within the range of a minimum of 30% and a maximum of 65%.

For the same purpose, the spacer layer 16 includes a second nonmagnetic layer 16c that contains copper and gallium, which is positioned between the main spacer layer 16b and the second magnetic layer L2 in contact with both. According to the same principle, the second nonmagnetic layer 16c may prevent oxidation of the second magnetic layer L2. The second nonmagnetic layer 16c is preferably made essentially of Cu and Ga and may contain a small amount of additive. The second nonmagnetic layer 16c may partially oxidize. In other words, the second nonmagnetic layer 16c may be made essentially of Cu, Ga, and O.

The configuration may provide only the first nonmagnetic layer 16a and omit the second nonmagnetic layer 16c. The layer configuration of the spacer layer 16 is to be a two layer configuration of the CuGa layer 16a and the main spacer layer 16b. In other words, the configuration in which the CuGa layer is disposed between the first magnetic layer L1 and the main spacer layer 16b is more effective from a perspective of improving the MR ratio than the configuration in which the CuGa layer is disposed between the second magnetic layer L2 and the main spacer layer 16b. Although the reason is not obvious, the inventors assumed that the behavior of oxygen during the film formation of the MR element 4 affects. In other words, each of the layers forming the MR element 4 can be formed by, for example, the sputtering method, and methods that use the target material of gallium oxide, or methods in which the formation atmosphere contains oxygen, can be used when forming gallium oxide. The migration of oxygen from gallium oxide to an adjacent layer is thought to frequently occur during or immediately after sputtering with all methods, and therefore it is assumed that the migration of oxygen to the first magnetic layer L1 occurs easily. That is to say, because the second magnetic layer L2 has a relatively low tendency to be oxidized, it is speculated that there is relatively little need or effect for the second nonmagnetic layer 16c. Therefore, a Cu layer or Zn layer, which are inferior in an oxidation prevention effect, can also be used as the second nonmagnetic layer 16c as described hereinafter. The Cu layer or Zn layer as the second nonmagnetic layer 16c may partially oxidize.

Referencing FIG. 1 again, the recording head 3 is disposed above the reproducing head 2 with an interelement shield layer 8 formed therebetween by the sputtering method or the like. The recording head 3 has a configuration for so-called perpendicular magnetic recording. The magnetic pole layer for writing is composed of a main magnetic pole layer 31 and an auxiliary magnetic pole layer 32. These magnetic pole layers are formed by a frame plating method or the like. The main magnetic pole layer 31 is formed from FeCo and is arranged with an orientation nearly orthogonal to the air bearing surface S on the air bearing surface S. A coil layer 23 extending over a gap layer 24 composed of an insulating material is wound around the periphery of the main magnetic pole layer 31 so that a magnetic flux is induced to the main magnetic pole layer 31 by the coil layer 23. The coil layer 23 is formed by a frame plating method or the like. The magnetic flux is guided within the main magnetic pole layer 31 and is emitted from the air bearing surface S towards the recording medium M. The main magnetic pole layer 31 is tapered not only in the film surface orthogonal direction P but also in the track width direction T near the air bearing surface S, to generate a minute and strong write magnetic field in accordance with the high recording density.

The auxiliary magnetic pole layer 32 is a magnetic layer magnetically coupled to the main magnetic pole layer 31. The auxiliary magnetic pole layer 32 is a magnetic layer with a film thickness between approximately 0.01 µm and approximately 0.5 µm and is formed of an alloy or the like composed of two or three of any of Ni, Fe, or Co. The auxiliary magnetic pole layer 32 is disposed in a manner of branching from the main magnetic pole layer 31 and opposes the main magnetic pole layer 31 with the gap layer 24 and a coil insulating layer 25 therebetween on the air bearing surface S side. The end part of the air bearing surface S of the auxiliary magnetic pole layer 32 forms the trailing shield part in which the layer cross-section is wider than other parts of the auxiliary magnetic pole layer 32. The magnetic field gradient between the auxiliary magnetic pole layer 32 and the main magnetic pole layer 31 becomes steeper in the vicinity of the air bearing surface S by providing this type of auxiliary magnetic pole layer 32. As a result, the signal output jitter is reduced, and the error rate during reading can be lowered.

Second Embodiment

Figure 4:
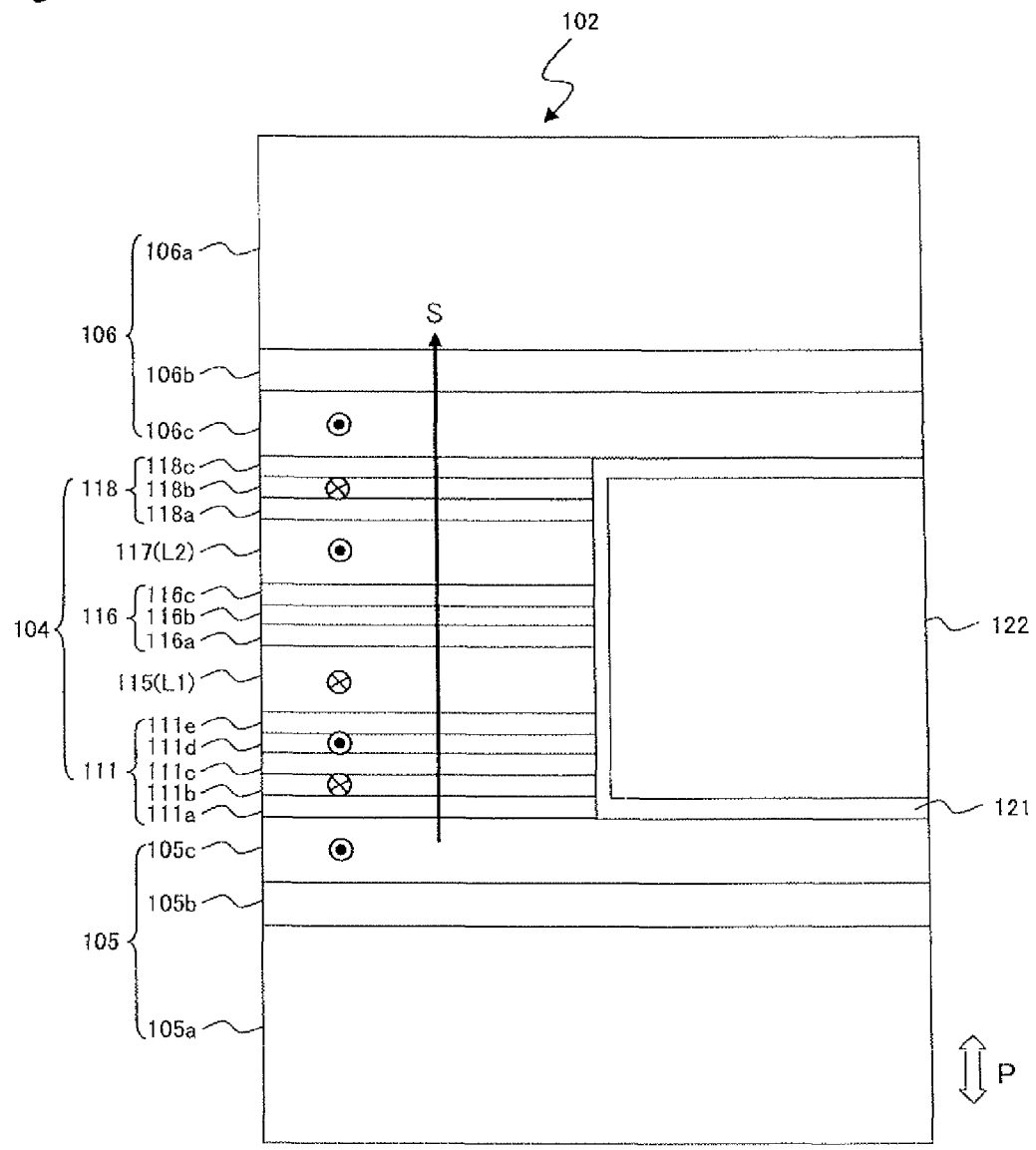
FIG. 4 is a cross sectional view, as viewed from the same direction as FIG. 1, of an MR element that relates to a second embodiment.

A thin film magnetic head 1 of the present embodiment is the same as the first embodiment indicated in FIG. 1 with the exception of the configuration of the reproducing head 2. The layer configuration of the MR element is indicated in FIG. 4 and Table 2. A reproducing head 102 includes an MR element 104 in which a plurality of layers are laminated in the same manner as in the first embodiment, and upper and lower shield layers 106 and 105 that are disposed so as to sandwich the MR element 104 in the film surface orthogonal direction P (lamination direction). The upper and lower shield layers 106 and 105 are also used as electrodes for the sense current S to flow sense current S in the film surface orthogonal direction P of the MR element 104.

With the present embodiment, a first magnetic layer L1 and a second magnetic layer L2 are respectively magnetization free layers 115 and 117 of which the magnetization directions changes in relation to the external magnetic field. The bias magnetic field application layer 122 is disposed on the backside of the MR element 104 as viewed from the air bearing surface S with the insulating layer 121 therebetween and applies a bias magnetic field to the first and second magnetization free layers 115 and 117 (first and second magnetic layers L1 and L2) in an orthogonal direction to the air bearing surface S. A spacer layer 116 is disposed between the first and second magnetization free layers 115 and 117. A first magnetic linkage layer 111 is disposed between the first magnetization free layer 115 and the lower shield layer 105, and a second magnetic linkage layer 118 is disposed between the second magnetization free layer 117 and the upper shield layer 106, respectively.

TABLE 2

| Film Configuration | | | Material | Film Thickness (nm) |
|---|---|---|---|---|
| Upper Shield Layer 106 | Second Main Shield Layer 106a | | NiFe | 2000 |
| | Second Anti-Ferromagnetic Layer 106b | | IrMn | 6 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 3.0 |
| | Spacer Layer 116 | Second Nonmagnetic Layer 116c | CuGa, Cu or Zn | 0.4 |
| | | Main Spacer Layer 116b | GaOx | 0.8 |
| | | First Nonmagnetic Layer 116a | CuGa | 0.4~1.0 |
| | First Magnetization Free Layer 115 (First Magnetic Layer L1) | | CoFe | 3.0 |

TABLE 2-continued

| Film Configuration | | Material | Film Thickness (nm) |
|---|---|---|---|
| First Magnetic Linkage Layer 111 | Exchange Coupling Transmitting Layer 111e | Ru | 0.8 |
| | Gap Adjustment Layer 111d | CoFe | 1.0 |
| | Exchange Coupling Transmitting Layer 111c | Ru | 0.8 |
| | Gap adjustment layer 111b | CoFe | 1.0 |
| | Exchange coupling transmitting layer 111a | Ru | 0.8 |
| Lower shield layer 105 | First exchange coupling magnetic field application layer 105c | NiFe | 20 |
| | | CoFe | 1.5 |
| | First anti-ferromagnetic layer 105b | IrMn | 6.0 |
| | First main shield layer 105a | NiFe | 2000 |

The lower shield layer 105 includes a first main shield layer 105a, and a first anti-ferromagnetic layer 105b and a first exchange coupling magnetic field application layer 105c laminated above the first main shield layer 105a. The magnetization direction of the first exchange coupling magnetic field application layer 105c is pinned in the track width direction T by anti-ferromagnetic coupling with the first anti-ferromagnetic layer 105b. Similarly, the upper shield layer 106 includes a second main shield layer 106a, and a second anti-ferromagnetic layer 106b and a second exchange coupling magnetic field application layer 106c laminated below the second main shield layer 106a. The magnetization direction of the second exchange coupling magnetic field application layer 106c is pinned in the track width direction T by anti-ferromagnetic coupling with the second anti-ferromagnetic layer 106b. The first and second exchange coupling magnetic field application layers 105c and 106c are magnetized mutually in the same direction. In other embodiments, instead of providing the first and second anti-ferromagnetic layers 105b and 106b and the first and second exchange coupling magnetic field application layers 105c and 106c, the magnetization directions of the first and second main shield layers 105a and 106a may be oriented in the same direction by forming in a long and narrow shape in the track width direction T and forming a single magnetic domain using a shape anisotropic effect.

The first magnetic linkage layer 111 has a structure in which gap adjustment layers 111b and 111d composed of CoFe are alternately and respectively laminated with exchange coupling transmitting layers 111a, 111c, and 111e composed of Ru, and the exchange coupling transmitting layers 111a and 111e are positioned at both side end surfaces. The second magnetic linkage layer 118, in the same manner as the first magnetic linkage layer 111, also has a structure in which a gap adjustment layer 118b composed of CoFe is alternately laminated with exchange coupling transmitting layers 118a and 118c composed of Ru, and the exchange coupling transmitting layers 118a and 118c are positioned at both side end surfaces. A pair of magnetic layers 105c and 111b, a pair of magnetic layers 111b and 111d, and a pair of magnetic layers 111d and 115 that respectively sandwich the exchange coupling transmitting layers 111a, 111c, and 111e perform exchange coupling. A pair of magnetic layers 106c and 118b and a pair of magnetic layers 118b and 117 that respectively sandwich the exchange coupling transmitting layers 118a and 118c perform exchange coupling. As illustrated in FIG. 4, the magnetization directions of the layers 105c, 111b, 111d, 115, and the magnetization directions of the layers 106c, 118b, and 117 alternately inverse (no bias magnetic field is applied).

The total film thickness of the MR element 104 can be adjusted to match the shield gap by adjusting the film thickness of the gap adjustment layers 111b, 111d, and 118b. The smaller the shield gap, the more beneficial it is to realize a high recording density; however, the shield gap may also be determined according to the required film thickness of the bias magnetic field application layer 122. In this case, adjusting the total film thickness, i.e. the shield gap, of the MR element 104 by changing the film thickness of the gap adjustment layers 111b, 111d, and 118b is preferable.

Figure 5:
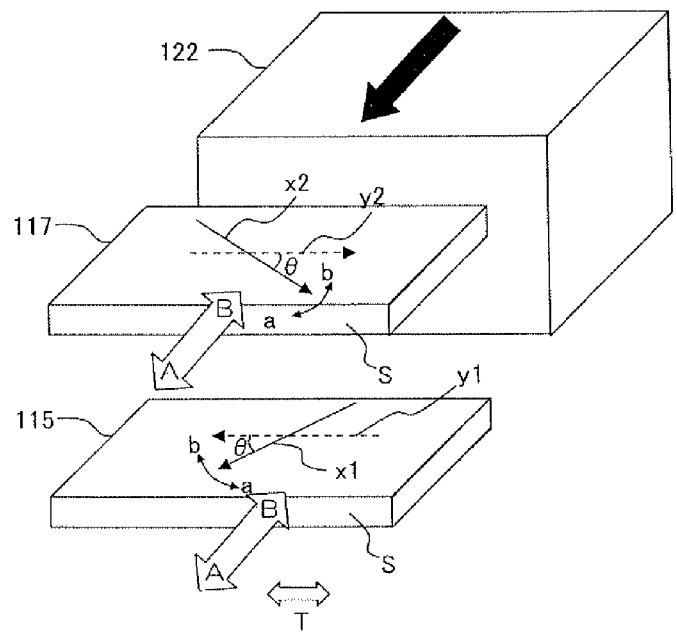
FIG. 5 is a schematic view illustrating the operation principle of a thin film magnetic head that relates to the second embodiment.

The above-described MR element 104 operates as will be described hereinafter. A virtual condition will be considered first in which there is no bias magnetic field application layer 122. FIG. 5 is a schematic drawing illustrating the magnetization of the first and second magnetization free layers 115 and 117. The magnetization directions of the first and second exchange coupling magnetic field application layers 105c and 106c transmit to the first and second magnetization free layers 115 and 117 while inversed by the gap adjustment layers 111b, 111d, and 118b with the exchange coupling transmitting layers 111a, 111c, 111e, 118a, and 118c therebetween. Therefore the first magnetization free layer 115 is magnetized in the track width direction T in an orientation y1 that is anti-parallel to the magnetization direction of the first exchange coupling magnetic field application layer 105c. The second magnetization free layer 117 is magnetized in the track width direction T in an orientation y2 that is the same as the magnetization direction of the second exchange coupling magnetic field application layer 106c.

Next, a condition will be considered in which a bias magnetic field is applied. The bias magnetic field causes the magnetization directions of the first and second magnetization free layers 115 and 117 oriented toward the track width direction T to rotate toward a direction that is orthogonal to the air bearing surface S. As illustrated by the solid line arrows x1 and x2 in FIG. 5, the magnetization directions rotate by the prescribed angle θ in mutually opposite rotational directions from the broken line arrows y1 and y2, and ideally are mutually orthogonal. This is the magnetization state of the first and second magnetization free layers 115 and 117 when no external magnetic field is applied.

When an external magnetic field is applied in this state, as illustrated by the outline arrows in the drawing, the magnetization directions of the first and second magnetization free layers 115 and 117 rotate in mutually opposite directions corresponding to the orientation of the external magnetic field. When the external magnetic field is applied in direction A in the drawing, the magnetization directions (solid line arrows x1 and x2) of the first and second magnetization free layers 115 and 117 rotate in direction (a) in the drawing, and when the external magnetic field is applied in direction B in the drawing, the magnetization directions of the first and second magnetization free layers 115 and 117 rotate in direction (b) in the drawing. In this manner, relative angles formed by magnetization directions of the first and second magnetization free layers 115 and 117 can be changed corresponding to the external magnetic field, and the resistance value for the sense current S can vary based on the magnetoresistive affect. Utilizing this principle, the MR element 104 can detect the orientation and strength of the external magnetic field.

In this manner, the MR element 104 of the present embodiment includes a pair of magnetization free layers 115 and 117 of which the magnetization directions changes corresponding to the external magnetic field, and the spacer layer 116 sandwiched by the magnetization free layers 115 and 117. The MR element 104 differs from the first embodiment with regards to the point that the both magnetization directions of the pair of magnetization free layers 115 and 117 rotate corresponding to the external magnetic field; however the same configuration is used for the spacer layer 116 as the spacer layer 16 in the first embodiment.

The magnetization directions of the first and second magnetization free layers 115 and 117 can be inversed by adjusting the total number of Ru layers and gap adjustment layers included in the first and second magnetic linkage layers 111 and 118. For example, when the magnetization directions of the upper shield layer 106 and the lower shield layer 105 are anti-parallel, the magnetization direction of the first magnetization free layer 115 can be inversed by configuring the first magnetic linkage layer 111 with two Ru layers 111a and 111c, and a single gap adjustment layer 111b inserted therebetween as illustrated in Table 3. In the same manner, a similar effect can be obtained with the configuration indicated in Table 2, although the illustration is omitted from the drawing, by configuring the second magnetic linkage layer 118 with a five layer structure that is similar to the first magnetic linkage layer 111.

EXAMPLE

The magnetoresistive effect film with the layer configuration indicated in Table 2 was formed on the substrate W made of $Al_2O_3$—TiC (ALTIC) using a radio frequency (RF) sputtering device. After film formation, heat treatment was performed for three hours at 250° C. The first and second magnetization free layers 115 and 117 are oriented in mutually orthogonal directions when there is no external magnetic field; however, they rotate freely when an external magnetic field is applied thereby generating a magnetoresistive effect.

The MR ratio was evaluated by changing the material and film thickness of the first nonmagnetic layer 116a in this multilayer film. Cu was used for the second nonmagnetic layer 116c. Table 4 illustrates MR ratios normalized by the MR ratio being set to 1 when a Ga40Cu60 alloy (film thickness 0.6 nm) is used as the first nonmagnetic layer 116a. The description of Ga x Cu (100-x) (when x is an integer between 0 and 100) indicates that the atomic percent of Ga is x(%) in the CuGa alloy. In addition, as a comparative example, the MR ratio was evaluated for when Cu and Au were used in the first nonmagnetic layer.

TABLE 4

| First Nonmagnetic Layer | Film Thickness (nm) | Normalized MR Ratio |
| --- | --- | --- |
| Cu | 0.4 | 0.89 |
| Cu | 0.6 | 0.85 |
| Cu | 0.8 | 0.80 |
| Ga10Cu90 | 0.6 | 0.87 |
| Ga30Cu70 | 0.6 | 0.97 |
| Ga40Cu60 | 0.4 | 0.99 |
| Ga40Cu60 | 0.6 | 1.00 |
| Ga40Cu60 | 0.8 | 0.96 |
| Ga40Cu60 | 1.0 | 0.91 |
| Ga60Cu40 | 0.6 | 0.96 |
| Ga65Cu35 | 0.6 | 0.94 |

TABLE 3

| Film Configuration | | | Material | Film Thickness (nm) |
| --- | --- | --- | --- | --- |
| Upper Shield Layer 106 | Second Main Shield Layer 106a | | NiFe | 2000 |
| | Second Anti-Ferromagnetic Layer 106b | | IrMn | 6 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 3.0 |
| | Spacer Layer 116 | Second Nonmagnetic Layer 116c | CuGa, Cu or Zn | 0.4 |
| | | Main Spacer Layer 116b | GaOx | 0.8 |
| | | First Nonmagnetic Layer 116a | CuGa | 0.4~1.0 |
| | First Magnetization Free Layer 115 (First Magnetic Layer L1) | | CoFe | 3.0 |
| | First magnetic linkage layer 111 | Exchange Coupling Transmitting Layer 111c | Ru | 0.8 |
| | | Gap Adjustment Layer 111b | CoFe | 1.0 |
| | | Exchange Coupling Transmitting Layer 111a | Ru | 0.8 |
| Lower Shield Layer 105 | First Exchange Coupling Magnetic Field Application Layer 105c | | NiFe | 20 |
| | | | CoFe | 1.5 |
| | First Anti-Ferromagnetic Layer 105b | | IrMn | 6.0 |
| | First Main Shield Layer 105a | | NiFe | 2000 |

TABLE 4-continued

| First Nonmagnetic Layer | Film Thickness (nm) | Normalized MR Ratio |
|---|---|---|
| Ga70Cu30 | 0.6 | 0.88 |
| Au | 0.6 | 0.80 |

Figure 6:
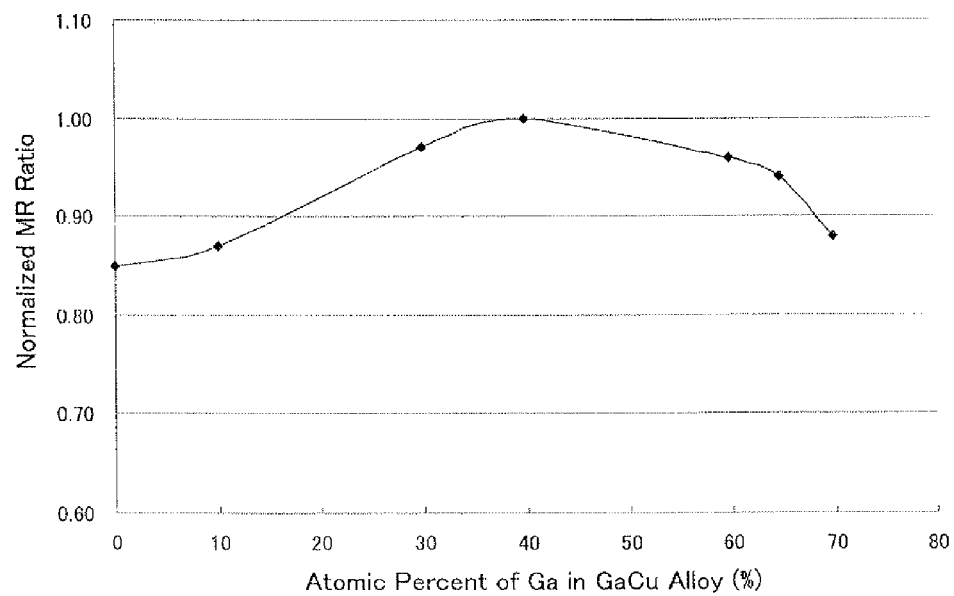
FIG. 6 is a graph illustrating the atomic percent of Ga in the CuGa alloy in the horizontal axis and the MR ratio in the vertical axis.

When comparing the normalized MR ratio in which the film thickness was 0.6 nm, the normalized MR ratio was 0.85 when Cu was used as the first nonmagnetic layer 116a and 0.80 when Au was used. In contrast, the normalized MR ratio was between 0.87 and 1 when CuGa was used. FIG. 6 is a graph illustrating the atomic percent of Ga in the CuGa alloy in the horizontal axis and the normalized MR ratio in the vertical axis for when a CuGa alloy was used as the first nonmagnetic layer 116a. The MR ratio increases regardless of the atomic percent of Ga when Ga is contained therein, compared to when there is absolutely no Ga contained therein. When the Ga content is particularly between 30% and 65%, the normalized MR ratio is a minimum of 0.94 which is a particularly large MR ratio. The range where the Ga content in the CuGa layer is between a minimum of 30% of atomic percent and a maximum of 65% of atomic percent generally matches with the range of 30% to 67% where an intermetallic compound phase may be generated as can be seen from FIG. 3. Therefore, it was confirmed from the example that the configuration of the atomic percent of Ga in the CuGa alloy is preferred to be between 30% and 65%, which is nearly the same as 30% to 67% where an intermetallic compound phase may be generated in theory.

Next, the MR ratio was examined by changing the film thickness for the first nonmagnetic layer 116a in which Ga40Cu60 and Cu were used. A tendency where the MR ratio decreases as the film thickness increases was observed in the case of Cu. Although a similar tendency was observed as the film thickness increased in the case of Ga40Cu60, the MR ratio was comparatively favorable when the film thickness is 0.4 to 1.0 nm. In the case of Cu, it is assumed that the first nonmagnetic layer 116a is formed in islands-shape with a film thickness of approximately 0.4 nm, and the range for direct contact between the main spacer layer 116b and the first magnetic layer 115 broadens when further reducing the film thickness, which promotes oxidation of the first magnetic material 115. Therefore, it is considered that approximately 0.89 is the upper limit of the normalized MR ratio. Accordingly, a larger MR ratio than Cu is presumed to be obtainable with a film thickness of a CuGa layer of 0.4 to 1.0 nm, or preferably, 0.4 to 0.8 nm.

Figure 7:
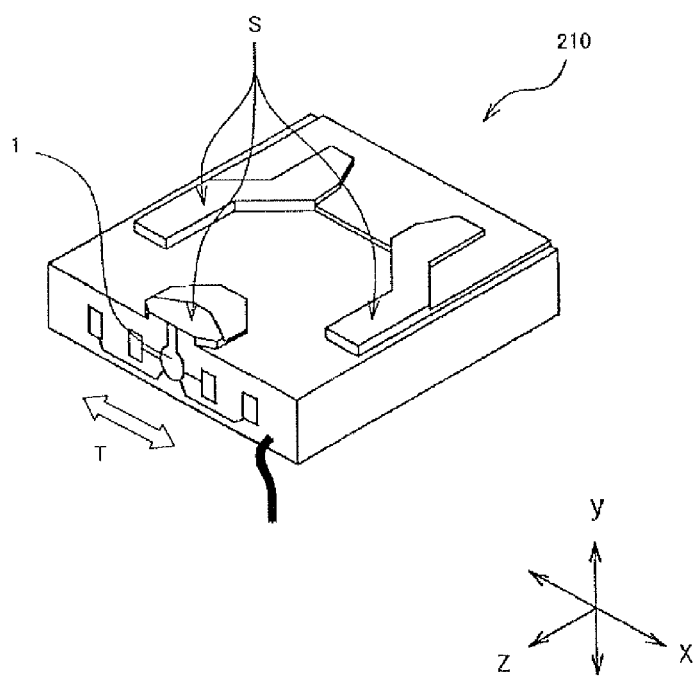
FIG. 7 is a perspective view of a magnetic head slider of the present invention.

Next, a description is given regarding a magnetic head slider on which the thin film magnetic head 1 is mounted. Referring to FIG. 7, a magnetic head slider 210 has a substantially hexahedral shape, and one surface of the six outer surfaces is the air bearing surface that opposes a hard disk. The magnetic head slider 210 is arranged in the hard disk device so as to oppose the hard disk, which is a disk-shaped recording medium M that is rotatably driven. When the hard disk rotates in the z-direction of FIG. 8, air flow passing between the hard disk and the magnetic head slider 210 generates a downward lifting force in the y-direction to the magnetic head slider 210. The magnetic head slider 210 flies above the surface of the hard disk due to the lifting force. In the vicinity of the edge part of the magnetic head slider 210 (edge part in bottom left of FIG. 8) on the air flow exit side, the thin film magnetic head 1 is formed.

Figure 8:
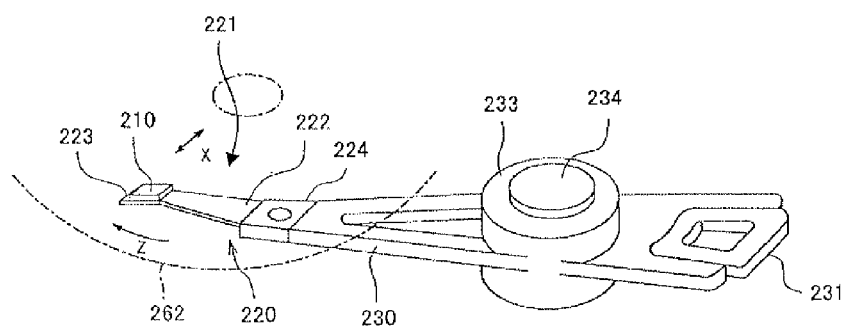
FIG. 8 is a perspective view of a head arm assembly of the present invention.

Referring to FIG. 8, a head gimbal assembly 220 includes the magnetic head slider 210 and a suspension 221 elastically supporting the magnetic head slider 210. The suspension 221 includes a load beam 222, a flexure 223, and a base plate 224. The load beam 222 is formed of stainless steel in a plate spring shape. The flexure 223 is arranged in one edge part of the load beam 222. The base plate 224 is arranged in the other edge part of the load beam 222. The magnetic head slider 210 is joined to the flexure 223 to give the magnetic head slider 210 suitable flexibility. At the part of the flexure 223 to which the magnetic head slider 210 is attached, a gimbal part is disposed to maintain the magnetic head slider 210 in an appropriate orientation.

An assembly in which the head gimbal assembly 220 is mounted to an arm 230 is referred to as a head arm assembly 221. The arm 230 moves the magnetic head slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 9:
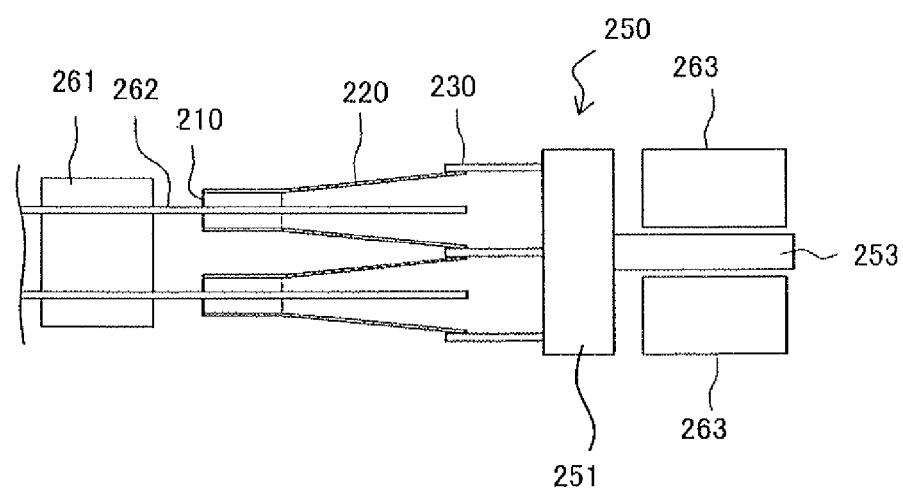
FIG. 9 is a side view of a magnetic head arm assembly of the present invention.
Figure 10:
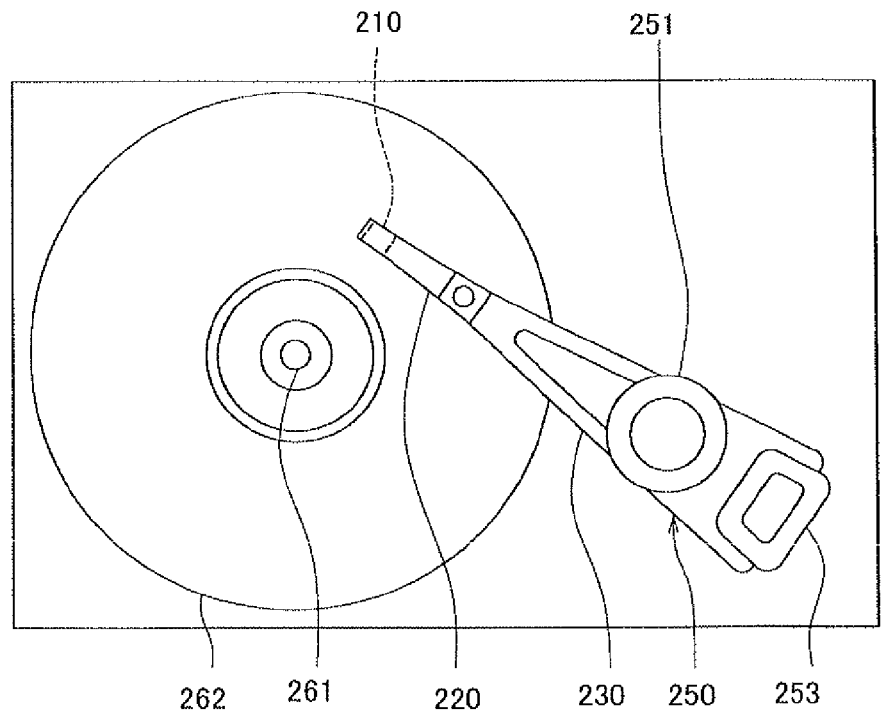
FIG. 10 is a plan view of a hard disk device of the present invention.

Next, referring to FIGS. 9 and 10, the description will be given with regard to a head stack assembly in which the above-described magnetic head slider is integrated, and the hard disk device. The head stack assembly is an assembly in which the head gimbal assembly 220 is attached to each arm of a carriage, which includes a plurality of the arms. FIG. 9 is a side view of the head stack assembly. FIG. 10 is a plan view of the hard disk device. The head stack assembly 250 includes a carriage 251 that includes a plurality of arms 230. On each of the arms 230, the head gimbal assembly 220 is mounted so that the head gimbal assemblies 220 align at an interval in the vertical direction. On the side of the carriage 251, which is the backside to the arm 230, a coil 253 is mounted to be a part of the voice coil motor. The voice coil motor includes permanent magnets 263 arranged so as to sandwich the coil 253 and to face each other.

Referring to FIG. 10, the head stack assembly 250 is integrated in the hard disk device. The hard disk device includes multiple hard disks 262 attached to a spindle motor 261. For each of the hard disks 262, two magnetic head sliders 210 are arranged in a manner of sandwiching the hard disk 262 and facing each other. The head stack assembly 250 except for the magnetic head slider 210 and the actuator correspond a positioning device, support the magnetic head slider 210, and position the magnetic head slider 210 with respect to the hard disk 262. The magnetic head slider 210 is moved in the track crossing direction of the hard disk 262 by the actuator, and is positioned with respect to the hard disk 262. The thin film magnetic head 1 included in the magnetic head slider 210 records information to the hard disk 262 with the recording head 3, and reproduces information recorded on the hard disk 262 with the reproducing heads 2 and 102.

While preferred embodiments of the present invention have been shown and described in detail, such description is for illustrative purposes only, and it is to be understood that changes and variations may be made without departing from the spirit or scope of the following claims.

What is claimed is:

1. A magnetoresistive effect element (MR element), comprising:
    first and second magnetic layers of which relative angles formed by magnetization directions change in relation to an external magnetic field; and
    a spacer layer positioned between the first magnetic layer and the second magnetic layer, wherein the first magnetic layer is positioned on a side closer than the second magnetic layer in regards to a substrate above which the magnetoresistive effect element is formed, and the spacer layer includes
- a main spacer layer made of gallium oxide as the primary component, and
- a first nonmagnetic layer positioned between the main spacer layer and the first magnetic layer and contains copper and gallium.

2. The MR element according to claim 1, wherein a content ratio of gallium to a total content of copper and gallium in the first nonmagnetic layer is at minimum 30% of atomic percent and at maximum 65% of atomic percent.

3. The MR element according to claim 2, wherein a film thickness of the first nonmagnetic layer is at minimum 0.4 nm and at maximum 1.0 nm.

4. The MR element according to claim 1, wherein the spacer layer includes a second nonmagnetic layer that is positioned between the main spacer layer and the second magnetic layer and that is formed from one of a nonmagnetic layer containing copper and gallium, a Cu layer, and a Zn layer.

5. A magnetic head that includes the MR element according to claim 1.

6. The magnetic head according to claim 5, wherein one of the first magnetic layer and the second magnetic layer is a magnetization free layer of which a magnetization direction changes in relation to the external magnetic field, and the other is a magnetization pinned layer of which a magnetization direction is pinned in relation to the external magnetic field, and the magnetic head, comprising
a pair of bias magnetic field application layers disposed on both sides of the MR element in a track width direction to apply a bias magnetic field in the track width direction to the magnetization free layer.

7. The magnetic head according to claim 5, wherein the first magnetic layer and the second magnetic layer are both magnetization free layers of which magnetization directions change in relation to the external magnetic field, and the magnetic head, comprising:
a bias magnetic field application layer disposed on a backside of the MR element as viewed from an air bearing surface to apply a bias magnetic field to the first and second magnetic layers in a direction orthogonal to the air bearing surface.

8. A magnetic head slider that includes the magnetic head according to claim 5.

9. A head gimbal assembly that includes the magnetic head according to claim 5.

10. A hard disk drive device that includes the magnetic head according to claim 5.

* * * * *